US010534513B2

(12) United States Patent
Liu (10) Patent No.: US 10,534,513 B2
(45) Date of Patent: Jan. 14, 2020

(54) METHOD FOR INDICATING JACK LOCATION AND TERMINAL (71) Applicant: Huawei Technologies Co., Ltd., Shenzhen (CN)

(72) Inventor: Xu Liu, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 60 days.

(21) Appl. No.: 15/746,679

(22) PCT Filed: Jul. 22, 2015

(86) PCT No.: PCT/CN2015/084734
§ 371 (c)(1),
(2) Date: Jan. 22, 2018

(87) PCT Pub. No.: WO2017/012078
PCT Pub. Date: Jan. 26, 2017

(65) Prior Publication Data
US 2019/0004674 A1    Jan. 3, 2019

(51) Int. Cl.
*G06F 3/0484* (2013.01)
*G09G 3/34* (2006.01)
*G06F 1/3212* (2019.01)

(52) U.S. Cl.
CPC ......... *G06F 3/0484* (2013.01); *G09G 3/3406* (2013.01); *G06F 1/3212* (2013.01); *G09G 2360/144* (2013.01)

(58) Field of Classification Search
CPC ... G06F 3/0484; G06F 1/3212; G09G 3/3406; G09G 5/006; G09G 2360/144
See application file for complete search history.

(56) References Cited

U.S. PATENT DOCUMENTS 6,435,690 B1    8/2002  Till
2006/0080386 A1*  4/2006  Roykkee ............... G06F 3/0481
                                                  709/203
(Continued)

FOREIGN PATENT DOCUMENTS

CN    203434651 U    2/2014
CN    104035648 A    9/2014
(Continued)

OTHER PUBLICATIONS

Machine Translation and Abstract of Japanese Publication No. JP2011248733, Dec. 8, 2011, 16 pages.
Foreign Communication From a Counterpart Application, Japanese Application No. 2018-502754, Japanese Notice of Reasons for Rejection dated Jan. 23, 2019, 3 pages.
(Continued)

*Primary Examiner* — Stephen G Sherman
(74) *Attorney, Agent, or Firm* — Conley Rose, P.C.

(57) ABSTRACT

A method for indicating a jack location, where the method includes detecting an illuminance value of an environment in which a terminal is located, detecting, by the terminal, second information when the terminal determines that the illuminance value is lower than a first predetermined threshold, and displaying, by the terminal, prompt information when the terminal determines that the second information meets a preset condition, where the prompt information is used to indicate a jack location. In this way, a user can easily and accurately find a jack location of a terminal device at a dark night or in a dim place.

18 Claims, 3 Drawing Sheets

(56) References Cited

U.S. PATENT DOCUMENTS

| | | | | |
|---|---|---|---|---|
| 2012/0040609 | A1* | 2/2012 | Griffin | H04B 5/0043 455/41.1 |
| 2013/0271013 | A1 | 10/2013 | Lee | |
| 2015/0301700 | A1* | 10/2015 | Komori | G06F 9/445 715/765 |

FOREIGN PATENT DOCUMENTS

| | | |
|---|---|---|
| EP | 2169924 B1 | 9/2011 |
| EP | 2418830 B1 | 4/2013 |
| JP | 2011248733 A | 12/2011 |
| JP | 2012504356 A | 2/2012 |
| JP | 2012044662 A | 3/2012 |
| JP | 2013223249 A | 10/2013 |

OTHER PUBLICATIONS

Foreign Communication From a Counterpart Application, Japanese Application No. 2018-502754, English Translation of Japanese Notice of Reasons for Rejection dated Jan. 23, 2019, 5 pages.

Machine Translation and Abstract of Chinese Publication No. CN104035648, Sep. 10, 2014, 11 pages.

Machine Translation and Abstract of Chinese Publication No. CN203434651, Feb. 12, 2014, 7 pages.

Foreign Communication From a Counterpart Application, PCT Application No. PCT/CN2015/084734, English Translation of International Search Report dated Apr. 1, 2016, 2 pages.

Foreign Communication From a Counterpart Application, PCT Application No. PCT/CN2015/084734, English Translation of Written Opinion dated Apr. 1, 2016, 5 pages.

* cited by examiner

METHOD FOR INDICATING JACK LOCATION AND TERMINAL

CROSS-REFERENCE TO RELATED APPLICATIONS

This application is a U.S. National Stage of International Patent Application No. PCT/CN2015/084734 filed on Jul. 22, 2015, which is hereby incorporated by reference in its entirety.

TECHNICAL FIELD

The present disclosure relates to the field of electronic application, and in particular, to a method for indicating a jack location and a terminal.

BACKGROUND

A great variety of mobile phone products are widely used in real life, and each type of mobile phone has a different charging jack location and earphone jack location. At a dark night or in a dim place, when a user needs to insert a mobile phone charger or an earphone, it is difficult for the user to find a jack location correctly at the first time. This brings unnecessary troubles to the user. Moreover, due to physical characteristics of a universal serial bus (USB) jack, a mobile phone has a fixed jack location for USB insertion, but the user often improperly inserts the USB jack into the mobile phone in an opposite direction in a use process. This case also brings unnecessary troubles to the user in the use process.

SUMMARY

Embodiments of the present disclosure provide a method for indicating a jack location and a terminal. Even if at a dark night or in a dim place, a user still can easily and accurately find a jack location of a terminal device, thereby avoiding an unnecessary trouble caused when the user uses the terminal in a case of inadequate light.

According to a first aspect, the present disclosure provides a method for indicating a jack location. The method includes detecting, by a terminal, an illuminance value of an environment in which the terminal is located, detecting, by the terminal, second information when the terminal determines that the illuminance value is lower than a first predetermined threshold, and displaying, by the terminal, prompt information when the terminal determines that the second information meets a preset condition, where the prompt information is used to indicate a jack location.

With reference to the first aspect, in a first possible implementation of the first aspect, the second information is a battery level of the terminal, and displaying, by the terminal, prompt information when the terminal determines that the second information meets the preset condition includes displaying, by the terminal, the prompt information when the terminal determines that the battery level of the terminal is lower than a second predetermined threshold, where the prompt information is used to indicate a first jack location.

With reference to the first aspect or the first possible implementation of the first aspect, in a second possible implementation of the first aspect, the second information is a running status of a first application program of the terminal, and displaying, by the terminal, prompt information when the terminal determines that the second information meets the preset condition includes displaying, by the terminal, the prompt information when the terminal determines that the first application program is running, where the prompt information is used to indicate a second jack location.

With reference to the second possible implementation of the first aspect, in a third possible implementation of the first aspect, the first application program includes a frequency modulation (FM) application or a music application.

With reference to the first aspect or the first possible implementation of the first aspect, in a fourth possible implementation of the first aspect, the second information is a noise value of the environment in which the terminal is located and a call status of the terminal, and displaying prompt information when the terminal determines that the second information meets the preset condition includes displaying the prompt information when the noise value of the environment in which the terminal is located is greater than a third predetermined threshold, and the terminal receives a call instruction, where the prompt information is used to indicate a second jack location, displaying the prompt information when the noise value of the environment in which the terminal is located is greater than a third predetermined threshold, and the terminal receives a dial instruction entered by a user, where the prompt information is used to indicate a second jack location, or displaying the prompt information when the noise value of the environment in which the terminal is located is greater than a third predetermined threshold, and the terminal is in a call, where the prompt information is used to indicate a second jack location.

According to a second aspect, the present disclosure provides a terminal. The terminal includes a detection unit, a processing unit, and a display unit, where the detection unit is configured to detect an illuminance value of an environment in which the terminal is located. The processing unit is configured to determine whether the illuminance value detected by the detection unit is lower than a first predetermined threshold. The detection unit is further configured to detect second information when the processing unit determines that the illuminance value is lower than the first predetermined threshold. The processing unit is further configured to determine whether the second information meets a preset condition, and the display unit is configured to display prompt information when the processing unit determines that the second information meets the preset condition, where the prompt information is used to indicate a jack location.

With reference to the second aspect, in a first possible implementation of the second aspect, the second information is a battery level of the terminal, and the display unit is further configured to display the prompt information when the processing unit determines that the battery level of the terminal is lower than a second predetermined threshold, where the prompt information is used to indicate a first jack location.

With reference to the second aspect or the first possible implementation of the second aspect, in a second possible implementation of the second aspect, the second information is a running status of a first application program of the terminal, and the display unit is further configured to display the prompt information when the processing unit determines to run the first application program, where the prompt information is used to indicate a second jack location.

With reference to the second possible implementation of the second aspect, in a third possible implementation of the second aspect, the first application program includes an FM application or a music application.

With reference to the second aspect or the first possible implementation of the second aspect, in a fourth possible implementation of the second aspect, the second information is a noise value of the environment in which the terminal is located and a call status of the terminal, and the display unit is further configured to display the prompt information when the noise value of the environment in which the terminal is located is greater than a third predetermined threshold, and the terminal receives a call instruction, where the prompt information is used to indicate a second jack location, display the prompt information when the noise value of the environment in which the terminal is located is greater than a third predetermined threshold, and the terminal receives a dial instruction entered by a user, where the prompt information is used to indicate a second jack location, or display the prompt information when the noise value of the environment in which the terminal is located is greater than a third predetermined threshold, and the terminal is in a call, where the prompt information is used to indicate a second jack location.

According to a third aspect, the present disclosure provides a terminal. The terminal includes a sensor, a processor, and a screen display, where the sensor is configured to detect an illuminance value of an environment in which the terminal is located. The processor is configured to determine whether the illuminance value detected by the sensor is lower than a first predetermined threshold. The sensor is further configured to detect second information when the processor determines that the illuminance value is lower than the first predetermined threshold. The processor is further configured to determine whether the second information meets a preset condition of the terminal, and send a prompt instruction to the screen display when the second information meets the preset condition, where the prompt instruction is used to instruct the screen display to display prompt information, and the screen display is configured to receive the prompt instruction, and display the prompt information according to the prompt instruction, where the prompt information is used to indicate a jack location.

With reference to the third aspect, in a first possible implementation of the third aspect, the second information is a battery level of the terminal, and the processor sends the prompt instruction to the screen display when the battery level of the terminal is lower than a second predetermined threshold, and the screen display receives the prompt instruction, and displays the prompt information according to the prompt instruction, where the prompt information is used to indicate a first jack location.

With reference to the third aspect or the first possible implementation of the third aspect, in a second possible implementation of the third aspect, the second information is a running status of a first application program of the terminal, and the processor sends the prompt instruction to the screen display when determining to run the first application program of the terminal, and the screen display receives the prompt instruction, and displays the prompt information according to the prompt instruction, where the prompt information is used to indicate a second jack location.

With reference to the third aspect or the first possible implementation of the third aspect, in a third possible implementation of the third aspect, the second information is a noise value of the environment in which the terminal is located and a call status of the terminal, and the processor sends the prompt instruction to the screen display when the noise value of the environment in which the terminal is located is greater than a third predetermined threshold, and the terminal receives a call instruction, and the screen display receives the prompt instruction, and displays the prompt information according to the prompt instruction, where the prompt information is used to indicate a second jack location, the processor sends the prompt instruction to the screen display when the noise value of the environment in which the terminal is located is greater than a third predetermined threshold, and the terminal receives a dial instruction entered by a user, and the screen display receives the prompt instruction, and displays the prompt information according to the prompt instruction, where the prompt information is used to indicate a second jack location, or the processor sends the prompt instruction to the screen display when the noise value of the environment in which the terminal is located is greater than a third predetermined threshold, and the terminal is in a call, and the screen display receives the prompt instruction, and displays the prompt information according to the prompt instruction, where the prompt information is used to indicate a second jack location.

Based on the foregoing technical solutions, according to the method for indicating a jack location and the terminal provided in the embodiments of the present disclosure, it is determined in real time or regularly whether the illuminance value of the environment in which the terminal is located is lower than the first predetermined threshold. When the illuminance value is lower than the first predetermined threshold, and a condition of the terminal meets the preset condition, the prompt information used to indicate the jack location is displayed according to the preset condition such that a user can easily and accurately find the jack location of the terminal device at a dark night or in a dim place.

DESCRIPTION OF EMBODIMENTS

The technical solutions of the present disclosure are further described in detail with reference to accompanying drawings and embodiments as follows.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

According to a method for indicating a jack location provided in an embodiment of the present disclosure, it is determined in real time or regularly whether an illuminance value of an environment in which a terminal is located is lower than a first predetermined threshold. Prompt information used to indicate a jack location is displayed according to a preset condition when the illuminance value is lower than the first predetermined threshold, and a condition of the terminal meets the preset condition. Therefore, a user can easily and accurately find a jack location of the terminal device at a dark night or in a dim place.

Figure 1:
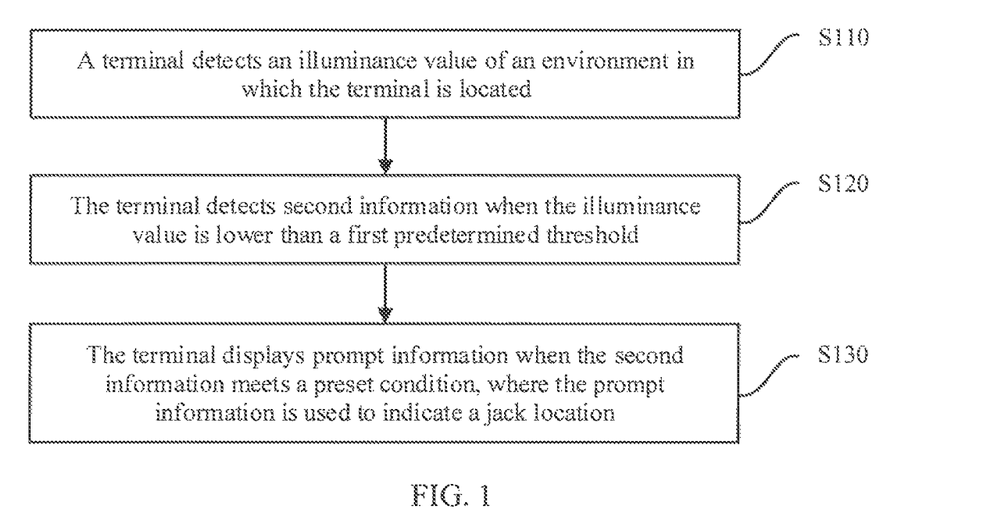
FIG. 1 is a schematic flowchart of a method for indicating a jack location according to an embodiment of the present disclosure.

FIG. 1 is a flowchart of a method for indicating a jack location according to an embodiment of the present disclosure. As shown in FIG. 1, the method includes the following steps.

Step S110: A terminal detects an illuminance value of an environment in which the terminal is located.

The terminal may detect, in real time or at an interval, the illuminance value of the environment in which the terminal is located.

Step S120: The terminal detects second information when the illuminance value is lower than a first predetermined threshold.

Step S130: The terminal displays prompt information when the second information meets a preset condition, where the prompt information is used to indicate a jack location.

The second information may include a battery level of the terminal, a running status of a first application program of the terminal, both a noise value of the environment in which the terminal is located and a call status of the terminal, or the like. The call status may include that the terminal receives a call instruction, the terminal receives a dial instruction entered by a user, the terminal is in a call, or the like. The preset condition may include that the battery level of the terminal is detected to be lower than a second predetermined threshold, or the terminal determines that the first application program just starts running or is running. The application program may include an FM application, a music application, or the like. Alternatively, the preset condition includes that the terminal detects that the noise value of the environment in which the terminal is located is greater than a third predetermined threshold, and the terminal receives a call instruction, the terminal detects that the noise value of the environment in which the terminal is located is greater than a third predetermined threshold, and the terminal receives a dial instruction entered by a user, or the terminal detects that the noise value of the environment in which the terminal is located is greater than a third predetermined threshold, and the terminal is in a call. The prompt information is displayed when any piece of the foregoing described second information meets a corresponding preset condition. The prompt information is used to indicate the jack location.

For example, the terminal displays the prompt information when the battery level of the terminal is lower than the second predetermined threshold. The prompt information is used to indicate a first jack location. In this embodiment of the present disclosure, the first jack location is a charger jack location.

Alternatively, the terminal displays the prompt information when the noise value of the environment in which the terminal is located is greater than the third predetermined threshold, and the terminal determines that the first application program is running. The prompt information is used to indicate a second jack location. In this embodiment, the second jack location is an earphone jack location.

It should be understood that, the terminal determines that the first application program is running may include that the terminal just starts running the first application program or the terminal is running the application program.

Alternatively, the prompt information displayed by the terminal is used to indicate a second jack location, when the noise value of the environment in which the terminal is located is greater than the third predetermined threshold, and the terminal receives a call instruction. In this embodiment of the present disclosure, the second jack location is an earphone jack location. Alternatively, the prompt information is displayed when the noise value of the environment in which the terminal is located is greater than the third predetermined threshold, and the terminal receives a dial instruction entered by a user. The prompt information is used to indicate a second jack location. Alternatively, the prompt information is displayed when the noise value of the environment in which the terminal is located is greater than the third predetermined threshold, and the terminal is in a call. The prompt information is used to indicate a second jack location.

It should be understood that, in this embodiment of the present disclosure, when the battery level of the terminal is lower than the second predetermined threshold, the prompt information displayed by the terminal is used to indicate the first jack location, that is, indicate the charger jack location. In addition, the prompt information may be used to indicate an insertion direction in order to ensure correct insertion of a charger plug.

It should be noted that, at one moment, in addition to one piece of information, there may be two or more pieces of information that simultaneously meet the preset condition and that are in the second information. For example, at one moment, the battery level of the terminal is lower than the second predetermined threshold, the noise value of the environment in which the terminal is located is greater than the third predetermined threshold, and the terminal receives a call instruction. Therefore, the prompt information displayed by the terminal is used to indicate the first jack location and the second jack location, that is, indicate the charger jack location and the direction of the charger jack, and the earphone jack location.

Therefore, according to the method for indicating a jack location provided in this embodiment of the present disclosure, the illuminance value of the environment in which the terminal is located is determined in real time or regularly. The second information is detected when the illuminance value is lower than the first predetermined threshold. When the terminal device determines that the second information meets the preset condition, the prompt information used to indicate the jack location is displayed according to the preset condition such that the user can easily and accurately find the jack location of the terminal device at a dark night or in a dim place.

Technical solutions of an embodiment of the present disclosure are further described in detail with reference to FIG. 2 and using a mobile phone as an example below.

Figure 2:
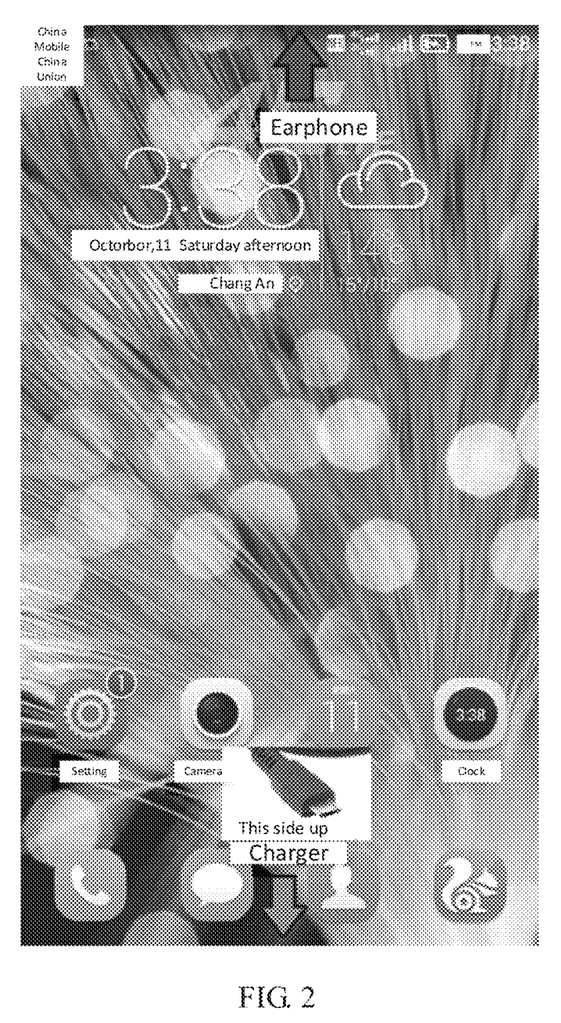
FIG. 2 is a schematic diagram of indicating a jack location according to an embodiment of the present disclosure.

FIG. 2 is a schematic diagram of indicating a jack location according to an embodiment of the present disclosure.

Further, in this embodiment of the present disclosure, the mobile phone may detect once, in real time or at an interval, an illuminance value of an environment in which the terminal is located. For example, every 5 minutes, the mobile phone may detect once, using a detection module such as a light sensor, the illuminance value (in units of lux) of the environment in which the terminal is located, and feed back a detection result to a processor. Light is considered to be inadequate when the mobile phone detects that the illuminance value of the environment in which the terminal is located is less than 0.5 lux. In addition, when a battery level of the mobile phone itself is lower than 15%, the mobile phone displays a schematic icon (shown in FIG. 2) of a charger jack location using a mobile phone screen in order to indicate the charger jack location, and indicate an insertion direction.

Therefore, according to a method for indicating a jack location provided in this embodiment of the present disclosure, the mobile phone detects once, in real time or at an interval, the illuminance value of the environment in which the terminal is located. In addition, when the illuminance value is lower than a first predetermined threshold, and the battery level of the mobile phone itself is less than a second predetermined threshold, prompt information used to indicate the charger jack location is displayed on the mobile phone screen. Therefore, a user can charge the mobile phone in time for continuous use.

Alternatively, in this embodiment of the present disclosure, when the illuminance value that is of the environment in which the terminal is located and that is detected by the mobile phone is less than 0.5 lux, a noise sensor inside the mobile phone detects that a noise value of an external environment of the mobile phone is greater than 100 decibels (dB), and the mobile phone of the user receives a call instruction, a noise sensor inside the mobile phone detects that a noise value of an external environment of the mobile phone is greater than 100 dB, and the mobile phone of the user receives a dial instruction entered by a user, or a noise sensor inside the mobile phone detects that a noise value of an external environment of the mobile phone is greater than 100 dB, and the mobile phone of the user is in a call, the mobile phone displays a schematic icon (shown in FIG. 2) of an earphone jack location using the mobile phone screen in order to indicate the earphone jack location.

Alternatively, in this embodiment of the present disclosure, when the illuminance value that is of the environment in which the terminal is located and that is detected by the mobile phone is less than 0.5 lux, a noise sensor inside the mobile phone detects that a noise value of an external environment of the mobile phone is greater than 100 dB, and the user just enables or has enabled an FM application or a music application on the mobile phone, the mobile phone displays a schematic icon (shown in FIG. 2) of an earphone jack location using the screen in order to indicate the earphone jack location.

Therefore, according to the method for indicating a jack location provided in this embodiment of the present disclosure, the mobile phone detects once, in real time or at an interval, the illuminance value of the environment in which the terminal is located. In addition, when the illuminance value is lower than the first predetermined threshold, the noise value that is of the environment in which the terminal is located and that is detected by the mobile phone is greater than a third predetermined threshold, and it is detected that the mobile phone is in a call status (including receiving a call instruction, or a dial instruction entered by a user, or being in a call), the prompt information used to indicate the earphone jack location is displayed on the mobile phone screen. Therefore, the user can process an answer service or a call service in time in order to communicate with others. Alternatively, when the user just enables or has already enabled an FM application or a music application on the mobile phone, the prompt information used to indicate the earphone jack location is displayed on the mobile phone screen. Therefore, the user can enjoy music in time.

In this embodiment of the present disclosure, at one moment, in addition to one piece of information, there may be two or more pieces of information that simultaneously meet a preset condition and that are in second information.

Further, in this embodiment of the present disclosure, when the illuminance value that is of the environment in which the terminal is located and that is detected by the mobile phone is less than 0.5 lux, the noise sensor inside the mobile phone detects that the noise value of the external environment of the mobile phone is greater than 100 dB, the user is enabling or has enabled an FM application on the mobile phone, and it is determined that the battery level of the mobile phone itself is lower than 15% at the moment, the mobile phone displays both the schematic icon of the charger jack location and the schematic icon of the earphone jack location (shown in FIG. 2) using the screen in order to indicate the charger jack location, the insertion direction, and the earphone jack location.

Therefore, according to the method for indicating a jack location provided in this embodiment of the present disclosure, the illuminance value of the environment in which the terminal is located is detected in real time or regularly. The second information is detected when the illuminance value is lower than the first predetermined threshold. When the terminal device determines that the second information meets the preset condition, the prompt information used to indicate the jack location is displayed according to the preset condition in order to ensure that the user can easily find the jack location of the terminal device when using the terminal device at a dark night or in a case of inadequate light.

It should be noted that mobile phones of various models have different jack locations, and therefore a database needs to be prestored in a mobile phone application when the method for indicating a jack location provided in the foregoing embodiments is performed in order to facilitate querying of a currently-used mobile phone model, and perform corresponding matching on the mobile phone (a charger jack location and an earphone jack location of the mobile phone are mainly to be matched in order to display corresponding locations on a mobile phone screen). The database may be further updated in real time using a network in order to facilitate adaptation of related data of a new mobile phone product.

Figure 3:
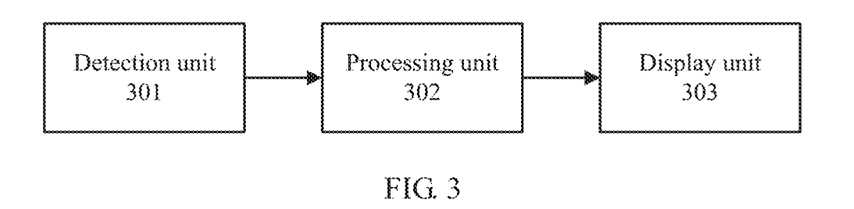
FIG. 3 is an example of a schematic structural diagram of a terminal according to an embodiment of the present disclosure.

FIG. 3 is an example of a schematic structural diagram of a terminal according to an embodiment of the present disclosure. As shown in FIG. 3, the terminal includes a detection unit 301, a processing unit 302, and a display unit 303.

The detection unit 301 is configured to detect an illuminance value of an environment in which the terminal is located.

Further, the detection unit 301 may detect, in real time or at an interval, the illuminance value of the environment in which the terminal is located.

The processing unit 302 is configured to determine whether the illuminance value detected by the detection unit 301 is lower than a first predetermined threshold.

The detection unit 301 is further configured to detect second information when the processing unit 302 determines that the illuminance value is lower than the first predetermined threshold.

The processing unit 302 is further configured to determine whether the second information meets a preset condition.

Further, the second information may include a battery level of the terminal, a running status of a first application program of the terminal, both a noise value of the environment in which the terminal is located and a call status of the terminal, or the like. The call status may include that the terminal receives a call instruction, the terminal receives a dial instruction entered by a user, the terminal is in a call, or the like. The preset condition may include that the processing unit 302 determines that the battery level of the terminal detected by the detection unit 301 is lower than a second predetermined threshold, or the processing unit 302 determines that the first application program just starts running or is running. The application program may include an FM application, a music application, or the like. Alternatively, the preset condition includes that the processing unit 302 determines that the noise value that is of the environment in which the terminal is located and that is detected by the detection unit 301 is greater than a third predetermined threshold, and the processing unit 302 receives a call instruction, the processing unit 302 detects that the noise value of the environment in which the terminal is located is greater than a third predetermined threshold, and the processing unit 302 receives a dial instruction entered by a user, or the processing unit 302 determines that the noise value that is of the environment in which the terminal is located and that is detected by the detection unit 301 is greater than a third predetermined threshold, and the terminal is in a call.

The display unit 303 is configured to display prompt information when the processing unit 302 determines that the second information meets the preset condition, where the prompt information is used to indicate a jack location.

Further, when the processing unit 302 determines that the second information meets the preset condition, for example, when the processing unit 302 determines that the battery level of the terminal is lower than the second predetermined threshold, the processing unit 302 instructs the display unit 303 to display the prompt information. The prompt information is used to indicate a first jack location. In this embodiment of the present disclosure, the first jack location is a charger jack location. Alternatively, when the noise value of the environment in which the terminal is located is greater than the third predetermined threshold, and the processing unit 302 determines that the first application program is running, the display unit 303 is instructed to display the prompt information. The prompt information is used to indicate a second jack location.

It should be understood that, that the processing unit 302 determines that the first application program is running may include that the terminal just starts running the first application program or the terminal is running the application program.

Alternatively, when the processing unit 302 determines that the noise value that is of the environment in which the terminal is located and that is detected by the detection unit 301 is greater than the third predetermined threshold, and the processing unit 302 receives a call instruction, the display unit 303 is instructed to display the prompt information. The prompt information is used to indicate a second jack location. In this embodiment of the present disclosure, the second jack location is an earphone jack location. Alternatively, when the detection unit 301 detects that the noise value of the environment in which the terminal is located is greater than the third predetermined threshold, and the processing unit 302 receives a dial instruction entered by a user, the display unit 303 is instructed to display the prompt information. The prompt information is used to indicate a second jack location. Alternatively, when the detection unit 301 detects that the noise value of the environment in which the terminal is located is greater than the third predetermined threshold, and the processing unit 302 determines that the terminal is in a call, the display unit 303 is instructed to display the prompt information. The prompt information is used to indicate a second jack location.

It should be understood that, in this embodiment of the present disclosure, the detection unit 301 is configured to not only detect the illuminance value of the environment in which the terminal is located, but also detect the noise value of the environment in which the terminal is located. The detection unit 301 may include a photosensor and/or a noise sensor, but this embodiment of the present disclosure is not limited thereto.

It should be further understood that, when the battery level of the terminal is lower than the second predetermined threshold, the prompt information displayed by the display unit 303 is used to indicate the first jack location, that is, indicate the charger jack location. In addition, the prompt information may be used to indicate an insertion direction in order to ensure correct insertion of a charger plug.

Further, in an embodiment of the present disclosure, the detection unit 301 may detect once, in real time or at an interval, the illuminance value of the environment in which the terminal is located. For example, every 5 minutes, the detection unit 301 detects once the illuminance value of the environment in which the terminal is located, and feeds back a detection result to the processing unit 302. When the illuminance value detected by the detection unit 301 is less than 0.5 lux, and the battery level of the terminal itself is lower than 15%, the processing unit 302 instructs the display unit 303 to display a schematic icon (shown in FIG. 2) of the charger jack location to indicate the charger jack location, and indicate the insertion direction.

Therefore, according to the terminal provided in this embodiment of the present disclosure, the detection unit 301 detects once, in real time or regularly, the illuminance value of the environment in which the terminal is located. In addition, when the illuminance value is lower than the first predetermined threshold, and the processing unit 302 determines that the battery level of the mobile phone itself is lower than the second predetermined threshold, the processing unit 302 instructs the display unit 303 to display the prompt information. The prompt information used to indicate the charger jack location helps the user to charge the mobile phone in time for continuous use.

Alternatively, in another embodiment of the present disclosure, when the illuminance value detected by the detection unit 301 is less than 0.5 lux, determining that a noise value that is of an external environment of the terminal and that is detected by the detection unit 301 is greater than 100 dB, and determining that the first application program of the terminal is running, the processing unit 302 instructs the display unit 303 to display a schematic icon (shown in FIG. 2) of the earphone jack location in order to indicate the earphone jack location.

It should be understood that the first application program may include an FM application or a music application. That the processing unit 302 determines that the first application program is running may include that the terminal just starts running the first application program or the terminal is running the application program.

Alternatively, in still another embodiment of the present disclosure, when the illuminance value that is of the environment in which the terminal is located and that is detected by the detection unit 301 is less than 0.5 lux, determining that a noise value that is of an external environment of the processing unit 302 and that is detected by the detection unit 301 is greater than 100 dB, and receiving a call instruction, the processing unit 302 instructs the display unit 303 to display a schematic icon (shown in FIG. 2) of the earphone jack location in order to indicate the earphone jack location.

Alternatively, in still another embodiment of the present disclosure, when the illuminance value detected by the detection unit 301 is less than 0.5 lux, determining that a noise value that is of an external environment of the processing unit 302 and that is detected by the detection unit 301 is greater than 100 dB, and receiving a dial instruction entered by a user, the processing unit 302 instructs the display unit 303 to display a schematic icon (shown in FIG. 2) of the earphone jack location in order to indicate the earphone jack location.

Alternatively, in the last embodiment of the present disclosure, when the illuminance value detected by the detection unit 301 is less than 0.5 lux, determining that a noise value that is of an external environment of the processing unit 302 and that is detected by the detection unit 301 is greater than 100 dB, and determining that the terminal is in a call, the processing unit 302 instructs the display unit 303 to display a schematic icon (shown in FIG. 2) of the earphone jack location in order to indicate the earphone jack location.

It should be understood that, in this embodiment of the present disclosure, when the battery level of the terminal is lower than the second predetermined threshold, the prompt information displayed by the terminal is used to indicate the first jack location, that is, indicate the charger jack location. In addition, the prompt information may be used to indicate the insertion direction in order to ensure correct insertion of a charger plug.

Therefore, according to the terminal provided in this embodiment of the present disclosure, the detection unit 301 detects once, in real time or at an interval, the illuminance value of the environment in which the terminal is located. In addition, when the illuminance value is lower than the first predetermined threshold, the noise value of the environment in which the terminal is located is detected to be greater than the third predetermined threshold, and the processing unit 302 determines that the terminal is in a call status (including receiving a call instruction, a dial instruction entered by a user, or being in a call), the processing unit 302 instructs the display unit 303 to display the prompt information used to indicate the earphone jack location. Therefore, the user can process an answer service or a call service in time in order to communicate with others. Alternatively, when receiving an indication that an FM application or a music application on the mobile phone just starts running or is running, the processing unit 302 instructs the display unit 303 to display the prompt information used to indicate the earphone jack location. Therefore, the user can enjoy music in time.

In this embodiment of the present disclosure, at one moment, in addition to one piece of information, there may be two or more pieces of information that simultaneously meet the preset condition and that are in the second information.

Further, in another embodiment of the present disclosure, when the illuminance value detected by the detection unit 301 is less than 0.5 lux, determining that a noise value that is of an external environment of the mobile phone and that is detected by the detection unit 301 is greater than 100 dB, receiving an indication that an FM application just starts running or is running, and determining that the battery level of the mobile phone itself is lower than 15% at the moment, the processing unit 302 instructs the display unit 303 to display both the schematic icon of the charger jack location and the schematic icon of the earphone jack location (shown in FIG. 2) in order to indicate the charger jack location, the insertion direction, and the earphone jack location.

Therefore, according to the terminal provided in this embodiment of the present disclosure, the illuminance value of the environment in which the terminal is located is detected in real time or regularly. The second information is detected when the illuminance value of the environment is lower than the first predetermined threshold. When the second information meets the preset condition, the prompt information used to indicate the jack location is displayed according to the preset condition in order to ensure that the user can easily find the jack location of the terminal when using the terminal at a dark night or in a case of inadequate light.

Figure 4:
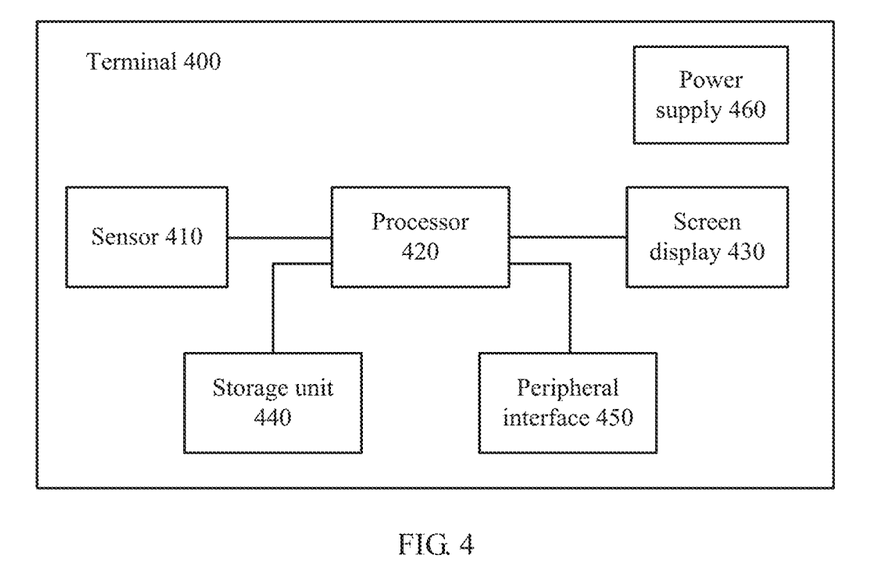
FIG. 4 is an example of a schematic structural diagram of a terminal according to an embodiment of the present disclosure.

FIG. 4 is an example of a schematic structural diagram of a terminal 400 according to an embodiment of the present disclosure. As shown in FIG. 4, the terminal 400 includes a sensor 410, a processor 420, and a screen display 430.

The sensor 410 is configured to detect an illuminance value of an environment in which the terminal 400 is located.

The processor 420 is configured to determine whether the illuminance value detected by the sensor 410 is lower than a first predetermined threshold.

The sensor 410 is further configured to detect second information when the processor 420 determines that the illuminance value is lower than the first predetermined threshold.

The processor 420 is further configured to determine whether the second information meets a preset condition of the terminal 400, and send a prompt instruction to the screen display 430 when the second information meets the preset condition.

The second information may include a battery level of the terminal 400, a running status of a first application program of the terminal 400, both a noise value of the environment in which the terminal 400 is located and a call status of the terminal 400, or the like. The call status may include that the terminal 400 receives a call instruction, the terminal 400 receives a dial instruction entered by a user, the terminal 400 is in a call, or the like. The preset condition may include that the processor 420 determines that the battery level of the terminal 400 detected by the sensor 410 is lower than a second predetermined threshold, or the processor 420 determines that the first application program just starts running or is running. The application program may include an FM application, a music application, or the like. Alternatively, the preset condition includes that the processor 420 determines that the noise value that is of the environment in which the terminal 400 is located and that is detected by a sensor 410 is greater than a third predetermined threshold, and the processor 420 receives a call instruction, the processor 420 detects that the noise value of the environment in which the terminal 400 is located is greater than a third predetermined threshold, and the processor 420 receives a dial instruction entered by a user, or the processor 420 determines that the noise value that is of the environment in which the terminal 400 is located and that is detected by the sensor 410 is greater than a third predetermined threshold, and the terminal 400 is in a call.

The processor 420 sends the prompt instruction to the screen display 430 when any one piece of the second information meets a corresponding preset condition.

The screen display 430 is configured to receive the prompt instruction, and display prompt information according to the prompt instruction, where the prompt information is used to indicate a jack location.

The processor 420 sends the prompt instruction to the screen display 430 when the second information meets the preset condition, for example, the processor 420 determines that the battery level of the terminal 400 is lower than the second predetermined threshold. The instruction is used to instruct the screen display 430 to display the prompt information. The screen display 430 receives the prompt instruction, and displays the prompt information according to the prompt instruction. The prompt information is used to indicate a first jack location. In this embodiment of the present disclosure, the first jack location is a charger jack location. Alternatively, the prompt instruction is sent to the screen display 430 when the noise value of the environment in which the terminal is located is greater than the third predetermined threshold, and the processor 420 determines that the first application program is running. The screen display 430 receives the prompt instruction, and displays the prompt information according to the prompt instruction. The prompt information is used to indicate a second jack location.

It should be understood that, that the processor 420 determines that the first application program is running may include that the terminal 400 just starts running the first application program or the terminal 400 is running the application program.

Alternatively, the processor 420 sends the prompt instruction to the screen display 430 when the noise value that is of the environment in which the terminal 400 is located and that is detected by the sensor 410 is greater than the third predetermined threshold, and receiving a call instruction. The screen display 430 receives the prompt instruction, and displays the prompt information according to the prompt instruction. The prompt information is used to indicate a second jack location. In this embodiment of the present disclosure, the second jack location is an earphone jack location. Alternatively, the prompt instruction is sent to the screen display 430 when the sensor 410 detects that the noise value of the environment in which the terminal 400 is located is greater than the third predetermined threshold, and the processor 420 receives a dial instruction entered by a user. The screen display 430 receives the prompt instruction, and displays the prompt information according to the prompt instruction. The prompt information is used to indicate a second jack location. Alternatively, the prompt instruction is sent to the screen display 430 when the sensor 410 detects that the noise value of the environment in which the terminal 400 is located is greater than the third predetermined threshold, and the processor 420 determines that the terminal 400 is in a call. The screen display 430 receives the prompt instruction, and displays the prompt information according to the prompt instruction. The prompt information is used to indicate a second jack location.

It should be understood that, in this embodiment of the present disclosure, the sensor 410 is configured to not only detect the illuminance value of the environment in which the terminal 400 is located, but also detect the noise value of the environment in which the terminal 400 is located. The sensor 410 may include a photosensor and/or a noise sensor, but this embodiment of the present disclosure is not limited thereto.

It should be further understood that, when the battery level of the terminal 400 is lower than the second predetermined threshold, the prompt information displayed by the screen display 430 is used to indicate the first jack location, that is, indicate the charger jack location. In addition, the prompt information may be used to indicate an insertion direction in order to ensure correct insertion of a charger plug.

Further, in an embodiment of the present disclosure, the sensor 410 may detect once, in real time or at an interval, the illuminance value of the environment in which the terminal 400 is located. For example, every 5 minutes, the sensor 410 detects once the illuminance value of the environment in which the terminal is located, and feeds back a detection result to the processor 420. The processor 420 sends the prompt instruction to the screen display 430 when the illuminance value detected by the sensor 410 is less than 0.5 lux, and determining that the battery level of the terminal itself is lower than 15%. The screen display 430 receives the prompt instruction, and displays a schematic icon (shown in FIG. 2) of the charger jack location according to the instruction in order to indicate the charger jack location, and indicate the insertion direction.

Therefore, according to the terminal 400 provided in this embodiment of the present disclosure, the sensor 410 detects once, in real time or regularly, the illuminance value of the environment in which the terminal 400 is located. In addition, when the illuminance value is lower than the first predetermined threshold, and the processor 420 determines that the battery level of the mobile phone itself is lower than the second predetermined threshold, the processor 420 instructs the screen display 430 to display the prompt information. According to the prompt information used to indicate the charger jack location, the user can charge the mobile phone in time for continuous use.

Alternatively, in another embodiment of the present disclosure, the processor 420 sends the prompt instruction to the screen display 430 when the illuminance value detected by the sensor 410 is less than 0.5 lux, determining that a noise value that is of an external environment of the processor 420 and that is detected by the sensor 410 is greater than 100 dB, and determining that the first application program of the terminal 400 is running. The screen display 430 receives the prompt instruction, and displays a schematic icon (shown in FIG. 2) of the earphone jack location according to the prompt instruction in order to indicate the earphone jack location.

It should be understood that, that the processor 420 determines that the first application program is running may include that the terminal 400 just starts running the first application program or the terminal 400 is running the application program.

Alternatively, in still another embodiment of the present disclosure, the processor 420 sends the prompt instruction to the screen display 430 when the illuminance value that is of the environment in which the terminal 400 is located and that is detected by the sensor 410 is less than 0.5 lux, determining that a noise value that is of an external environment of the processor 420 and that is detected by the sensor 410 is greater than 100 dB, and receiving a call instruction. The screen display 430 receives the prompt instruction, and displays a schematic icon (shown in FIG. 2) of the earphone jack location according to the instruction in order to indicate the earphone jack location.

Alternatively, in still another embodiment of the present disclosure, the processor 420 sends the prompt instruction to the screen display 430 when the illuminance value detected by the sensor 410 is less than 0.5 lux, determining that a noise value that is of an external environment of the processor 420 and that is detected by the sensor 410 is greater than 100 dB, and receiving a dial instruction entered by a user. The screen display 430 receives the prompt instruction, and displays a schematic icon (shown in FIG. 2) of the earphone jack location according to the prompt instruction in order to indicate the earphone jack location.

Alternatively, in the last embodiment of the present disclosure, the processor 420 sends the prompt instruction to the screen display 430 when the illuminance value detected by the sensor 410 is less than 0.5 lux, determining that a noise value that is of an external environment of the processor 420 and that is detected by the sensor 410 is greater than 100 dB, and determining that the terminal 400 is in a call. The screen display 430 receives the prompt instruction, and displays a schematic icon (shown in FIG. 2) of the earphone jack location according to the prompt instruction in order to indicate the earphone jack location.

It should be understood that, in this embodiment of the present disclosure, when the battery level of the terminal 400 is lower than the second predetermined threshold, the prompt information displayed by the terminal 400 is used to indicate the first jack location, that is, indicate the charger jack location. In addition, the prompt information may be used to indicate the insertion direction in order to ensure correct insertion of a charger plug.

Therefore, according to the terminal 400 provided in this embodiment of the present disclosure, the sensor 410 detects once, in real time or at an interval, the illuminance value of the environment in which the terminal 400 is located. In addition, when the illuminance value is lower than the first predetermined threshold, the noise value of the environment in which the terminal 400 is located is detected to be greater than the third predetermined threshold, and the processor 420 determines that the terminal 400 is in a call status (including receiving a call instruction, a dial instruction entered by a user, or being in a call), the processor 420 instructs the screen display 430 to display the prompt information used to indicate the earphone jack location. Therefore, the user can process an answer service or a call service in time in order to communicate with others. Alternatively, when receiving an indication that the first application program just starts running or is running, the processor 420 instructs the screen display 430 to display the prompt information used to indicate the earphone jack location. Therefore, the user can enjoy music in time.

In this embodiment of the present disclosure, at one moment, in addition to one piece of information, there may be two or more pieces of information that simultaneously meet the preset condition and that are in the second information.

Further, in another embodiment of the present disclosure, when the illuminance value detected by the sensor 410 is less than 0.5 lux, determining that a noise value that is of an external environment of the mobile phone and that is detected by the sensor 410 is greater than 100 dB, receiving an indication that the first application program just starts running or is running, and determining that the battery level of the mobile phone itself is lower than 15% at the moment, the processor 420 instructs the screen display 430 to display both the schematic icon of the charger jack location and the schematic icon of the earphone jack location (shown in FIG. 2) in order to indicate the charger jack location, the insertion direction, and the earphone jack location.

Therefore, according to the terminal 400 provided in this embodiment of the present disclosure, the illuminance value of the environment in which the terminal 400 is located is detected in real time or regularly. The second information is detected when the illuminance value of the environment is lower than the first predetermined threshold. When the second information meets the preset condition, the prompt information used to indicate the jack location is displayed according to the preset condition in order to ensure that the user can easily find the jack location of the terminal 400 when using the terminal 400 at a dark night or in a case of inadequate light.

It should be noted that, in this embodiment of the present disclosure, the terminal 400 shown in FIG. 4 further includes components such as a storage unit 440, a peripheral interface 450, and a power supply 460. The components shown in FIG. 4 may perform communication using one or more buses. A person skilled in the art may understand that, a structure of the terminal 400 shown in FIG. 4 does not constitute a limitation on the present disclosure. The structure may be a bus structure, or may be a star structure, and may further include more or fewer components than those shown in FIG. 4, or combine some components, or have different component arrangements. In this embodiment of the present disclosure, the terminal 400 may be a mobile phone.

The following describes the composition parts of the terminal 400 shown in FIG. 1 in detail.

The sensor 410 may be a light sensor or a noise sensor. Further, the light sensor may include an ambient light sensor and a proximity sensor. The ambient light sensor may adjust luminance of the screen display 430 according to brightness of ambient light, and the proximity sensor may close backlight of the screen display 430 when the terminal 400 (mainly referring to the mobile phone) approaches an ear. The noise sensor is applicable to fixed-point online monitoring of ambient noise and automatic noise measurement of a vehicle test line.

The processor 420 is a control center of the terminal 400, and connects parts of the entire electronic device using various interfaces and lines. The processor 420 performs various functions of the terminal 400 and/or processes data by running or executing a software program and/or a module stored in the storage unit 440 and by invoking data stored in the storage unit 440. The processor 420 may include an integrated circuit (IC), for example, may include a singly-encapsulated IC or may include multiple connected encapsulated ICs with a same function or different functions. For example, the processor 420 may include only a central processing unit (CPU), or may be a combination of a graphical processing unit (GPU) and a digital signal processor (DSP). In this embodiment of the present disclosure, the CPU may include a single computing core, or may include multiple computing cores.

For example, the screen display 430 may be a screen display disposed in a form of a liquid crystal display (LCD), an organic light-emitting diode (OLED), or a field emission display (FED).

The storage unit 440 may be configured to store a software program and a module. By running the software program and the module that are stored in the storage unit 440, the processor 420 executes various function applications of the terminal 400 and implements data processing. The storage unit 440 mainly includes a program storage area and a data storage area, where the program storage area may store an operating system, an application program required by at least one function, such as a sound playing program or an image playing program. The data storage area may store data (such as audio data or an address book) created according to use of the terminal 400, and the like. In a specific implementation of the present disclosure, the storage unit 440 may include nonvolatile memory, such as a nonvolatile random access memory (NVRAM), a phase change random access memory (PRAM), or a magnetoresistive random access memory (MRAM), or may include a at least one magnetic disk storage device, an electrically erasable programmable read-only memory (EEPROM), or a flash storage device such as an NOR flash memory or an NAND flash memory. The nonvolatile memory stores the operating system and the application program executed by the processor 420. The processor 420 loads, from the non-volatile memory, a running program and data to a memory, and stores digital content into a massive storage apparatus. The operating system includes various components and/or drivers that are configured to control and manage routine system tasks, such as memory management, storage device control, or power management, and facilitate communication between various software and hardware. In this embodiment of the present disclosure, the operating system may be the ANDROID operating system of GOOGLE, the IOS system developed by APPLE incorporated, the WINDOWS operating system developed by MICROSOFT Corporation, or an embedded operating system such as VXWORKS The application program includes any application installed on the mobile phone terminal, including but not limited to a browser, an electronic mail (e-mail), an instant messaging service, word processing, keyboard virtualization, a widget, encryption, digital copyright management, speech recognition, speech reproduction, positioning (for example, a function provided by a Global Positioning System), and music play.

The peripheral interface 450 includes a USB jack, an earphone jack, or the like.

The power supply 460 is configured to supply power to various parts of the terminal 400 to maintain running of the terminal 400. Generally, the power supply 460 may be a built-in battery, for example, a common lithium-ion battery or a nickel-metal hydride battery, and may also include an external power supply that directly supplies power to the terminal 400, for example, an alternating current (AC) adapter.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an EEPROM, a register, a hard disk, a removable disk, a compact disc ROM (CD-ROM), or any other form of storage medium known in the art.

In the foregoing specific implementations, the objective, technical solutions, and benefits of the present disclosure are further described in detail. It should be understood that the foregoing descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A method for indicating jack locations, comprising:
   detecting, by a terminal, an illuminance value of an environment in which the terminal is located;
   detecting, by the terminal, second information and third information in response to the illuminance value being lower than a first predetermined threshold, wherein the second information comprises sound information, and wherein the third information comprises battery level information;
   displaying, by the terminal, first prompt information in response to the second information meeting a first preset condition, wherein the first prompt information displays an indication of a headphone jack location on a display of the terminal; and
   displaying, by the terminal, second prompt information in response to the third information meeting a second preset condition, wherein the second prompt information displays an indication of a charging jack location on the display of the terminal.

2. The method of claim 1, wherein the indication of the charging jack location is displayed on the display of the terminal when a battery level of the terminal is lower than a second predetermined threshold.

3. The method of claim 1, wherein the indication of the headphone jack location is displayed on the terminal when a first application program is running.

4. The method of claim 3, wherein the first application program comprises a frequency modulation (FM) application.

5. The method of claim 3, wherein the first application program comprises a music application.

6. The method of claim 1, wherein the second information further comprises a call status of the terminal, and wherein displaying the first prompt information comprises:
   displaying, by the terminal, the first prompt information when the sound information is greater than a third predetermined threshold and the terminal receives a call instruction;
   displaying, by the terminal, the first prompt information when the sound information is greater than the third predetermined threshold and the terminal receives a dial instruction from a user; and
   displaying, by the terminal, the first prompt information when the sound information is greater than the third predetermined threshold and the terminal is in a call.

7. The method of claim 1, wherein the terminal is configured to simultaneously display both the indication of the headphone jack location and the indication of the charging jack location on the display of the terminal at a same time.

8. A terminal, comprising:
   a memory comprising instructions; and
   a processor coupled to the memory, wherein the instructions cause the processor to be configured to:
      detect an illuminance value of an environment in which the terminal is located;
      determine whether the illuminance value is lower than a first predetermined threshold;
      detect second information and third information in response to the illuminance value being lower than the first predetermined threshold, wherein the second information comprises sound information, and wherein the third information comprises battery level information;

determine whether the second information meets a first preset condition and whether the third information meets a second preset condition;

display first prompt information in response to the second information meeting the first preset condition, wherein the first prompt information displays an indication of a headphone jack location on a display of the terminal; and display second prompt information in response to the third information meeting the second preset condition, wherein the second prompt information displays an indication of a charging jack location on the display of the terminal.

9. The terminal of claim 8, wherein the processor is configured to display the second prompt information comprises the processor being configured to display the second prompt information when a battery level of the terminal is lower than a second predetermined threshold.

10. The terminal of claim 8, wherein the processor is configured to display the first prompt information comprises the processor being configured to display the first prompt information when a first application program is running.

11. The terminal of claim 10, wherein the first application program comprises a frequency modulation (FM) application.

12. The terminal of claim 10, wherein the first application program comprises a music application.

13. The terminal of claim 8, wherein the processor is further configured to simultaneously display both the indication of the headphone jack location and the indication of the charging jack location on the display of the terminal at a same time.

14. A terminal, comprising:
a sensor configured to detect an illuminance value of an environment in which the terminal is located;
a processor coupled to the sensor and configured to:
determine whether the illuminance value is lower than a first predetermined threshold;
detect second information and third information in response to the illuminance value being lower than the first predetermined threshold, wherein the second information comprises sound information, and wherein the third information comprises battery level information;
determine whether the second information meets a first preset condition of the terminal and whether the third information meets a second preset condition of the terminal;
send a first prompt instruction to a screen display when the second information meets the first preset condition, wherein the first prompt instruction instructs the screen display to display first prompt information, and wherein the first prompt information displays an indication of a headphone jack location on the screen display of the terminal; and
send a second prompt instruction to the screen display when the third information meets the second preset condition, wherein the second prompt instruction instructs the screen display to display second prompt information, and wherein the second prompt information displays in indication of a charging jack location on the screen display of the terminal.

15. The terminal of claim 14, wherein the processor is further configured to send the second prompt instruction to the screen display when the battery level of the terminal is lower than a second predetermined threshold.

16. The terminal of claim 14, wherein the processor is further configured to send the first prompt instruction to the screen display when a first application program of the terminal is running.

17. The terminal of claim 14, wherein the second information comprises a noise value of the environment in which the terminal is located and a call status of the terminal, and wherein the processor is further configured to:
send the first prompt instruction to the screen display when the noise value of the environment in which the terminal is located is greater than a third predetermined threshold and the terminal receives a call instruction;
send the first prompt instruction to the screen display when the noise value of the environment in which the terminal is located is greater than the third predetermined threshold and the terminal receives a dial instruction from a user; and
send the first prompt instruction to the screen display when the noise value of the environment in which the terminal is located is greater than the third predetermined threshold and the terminal is in a call.

18. The terminal of claim 14, wherein the processor is further configured to simultaneously display both the indication of the headphone jack location and the indication of the charging jack location on the screen display of the terminal at a same time.

* * * * *